United States Patent [19]

Takahashi et al.

[11] Patent Number: 4,507,729
[45] Date of Patent: Mar. 26, 1985

[54] ERROR PROCESSING SYSTEM USING TWO DIFFERENT TYPES OF REPLACE LOGIC

[75] Inventors: Masanori Takahashi, Tokyo; Terutaka Tateishi, Kawasaki, both of Japan

[73] Assignee: Fujitsu Limited, Kawasaki, Japan

[21] Appl. No.: 411,318

[22] Filed: Aug. 25, 1982

[30] Foreign Application Priority Data

Aug. 27, 1981 [JP] Japan .................. 56-134572

[51] Int. Cl.³ .......................................... G06F 11/00
[52] U.S. Cl. ........................................... 364/200
[58] Field of Search .................. 364/200 MS File

[56] References Cited

U.S. PATENT DOCUMENTS 3,958,228  5/1976  Coombes et al. ............ 364/200
4,092,713  5/1978  Scheuneman ............... 364/200
4,349,875  9/1982  Tada .......................... 364/200

Primary Examiner—Raulfe B. Zache
Attorney, Agent, or Firm—Staas & Halsey

[57] ABSTRACT

A buffer storage which stores some of the blocks, into which a main storage is divided, and, when a new block is to be stored, designates a block to be replaced based on least recently used logic designating the least recently used block as the block to be replaced. When the buffer storage is put in a state in which the designation of the block to be replaced is not carried out, it is detected and logic different from the least recently used logic is used to designate the block to be replaced, thereby preventing failure of designation of the block to be replaced and consequently a block is replaced.

15 Claims, 16 Drawing Figures

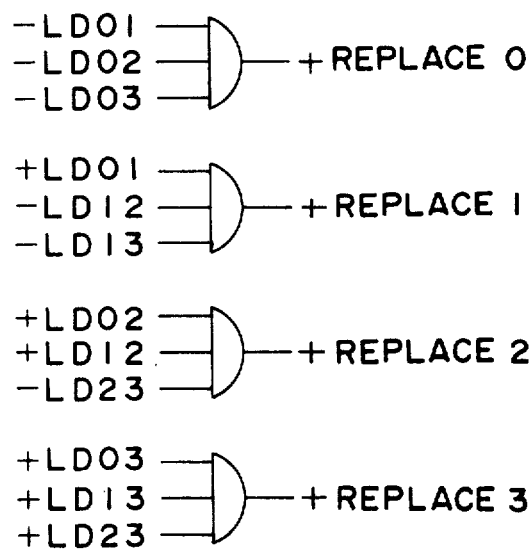

FIG. 6A
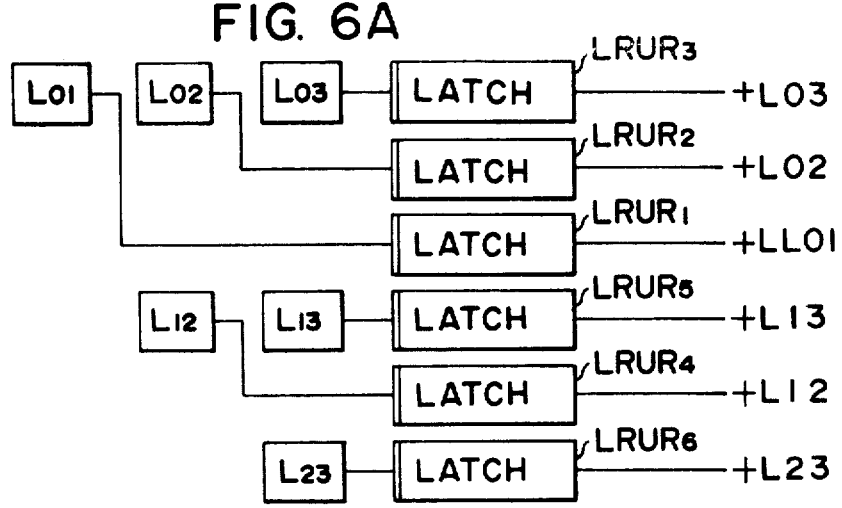
FIG. 6B
OPERATION STATE REGISTER
FIG. 6C
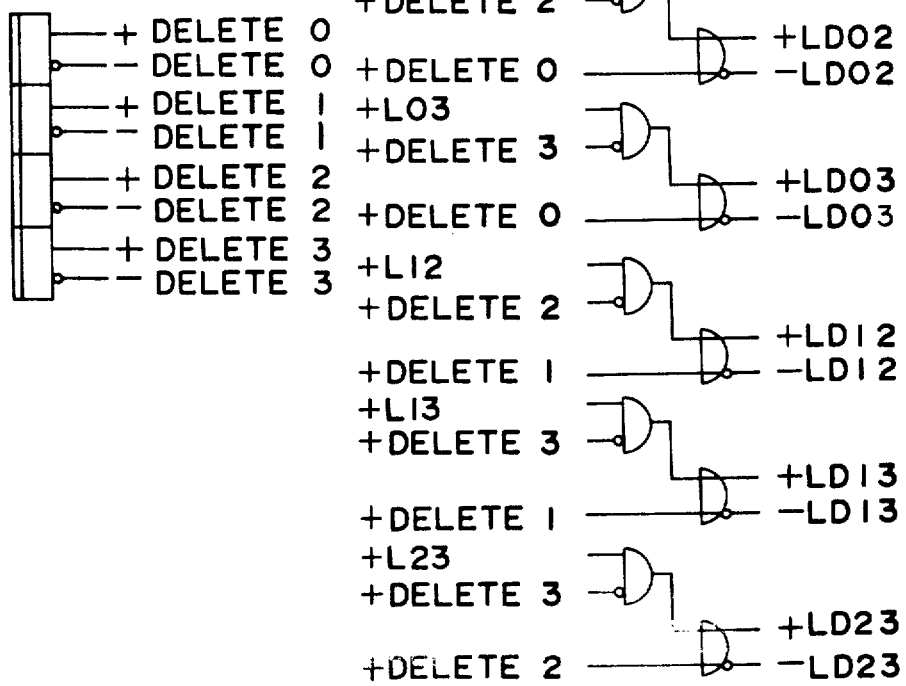

ERROR PROCESSING SYSTEM USING TWO DIFFERENT TYPES OF REPLACE LOGIC

BACKGROUND OF THE INVENTION

1. Field of the Invention

The present invention relates to a buffer storage which performs replacement processing based on an LRU (Least Recently Used) system and, more particularly, to an error processing system for a buffer storage which permits determination of a replace block even if an error occurs in an LRU circuit.

2. Description of the Prior Art

The LRU system replaces the least recently used data giving it first priority when moving out to a main storage data read out therefrom and stored in a buffer storage, so that data of the highest frequency use can be held in with buffer storage at all times.

In the buffer storage employing such an LRU system, a unit of data or a block to be replaced is usually determined in the following manner: An LRU circuit outputs an LRU pattern, that is information for determining the block to be replaced, and a replace logic circuit decodes each bit of the LRU information on the basis of a predetermined replacement algorithm and yields an output designating only one block to be replaced. On the other hand, an update logic circuit determines the order in which blocks were used, thereby updating the LRU pattern in the LRU circuit to ensure that the LRU pattern always holds information on the block to be replaced. This is based on the assumption that the most previously used or earliest used block would be the least recently used one, so that data having the highest frequency of use can always be loaded in the buffer storage.

In the case where a fixed or intermittent fault occurs in the LRU circuit and generates an LRU pattern other than a predetermined one, the replacement algorithm in the replace logic circuit is affected by the fault in the LRU circuit, resulting in no output being produced by the replace logic circuit for designating the block to be replaced because of the fault pattern. Such an error is a serious fault in the buffer storage for a swap system in which the update of data in the main storage is carried out only for the data loaded into the buffer storage. The reason is that in the swap system the opportunity for the data of the main storage to be updated is lost by the above-described error, in contrast to a store through system in which the same data loaded in the buffer storage and the main storage are simultaneously updated.

As a solution to this problem, duplication of the LRU circuit has been considered; however, this prevents the failure of the system but increases the amount of hardware used, resulting in increased manufacturing costs.

SUMMARY OF THE INVENTION

It is therefore an object of the present invention to provide an error processing system for a buffer storage using the LRU system which prevents a system failure resulting from an LRU error.

Another object of the present invention is to provide an error processing system for a buffer storage which can be implemented by the addition of a circuit arrangement which involves less hardware than when duplicating the LRU circuit.

Yet another object of the present invention is to provide an error processing system for a buffer storage which can be obtained at a lower cost than when duplicating the LRU circit. A buffer storage which stores some of the blocks, into which a main storage is divided, and, when a new block is to be stored, designates a block to be replaced based on least recently used logic designating the least recently used block as the block to be replaced. When the buffer storage is put in a state in which the designation of the block to be replaced is not carried out, the state is detected and logic different from the least recently used logic is used to designate the block to be replaced, thereby preventing failure of designation of the block to be replaced and consequently a block is replaced.

The above-described and other objects of the present invention will become more fully apparent from the following description taken in conjunction with the accompanying drawings.

BRIEF DESCRIPTION OF THE DRAWINGS

FIG. 5 is a diagram of recovery logic for FIG. 1;

FIGS. 6A to 6D are diagrams of the replace logic circuit 7 of FIG. 1;

DESCRIPTION OF THE PREFERRED EMBODIMENTS

Figure 1:
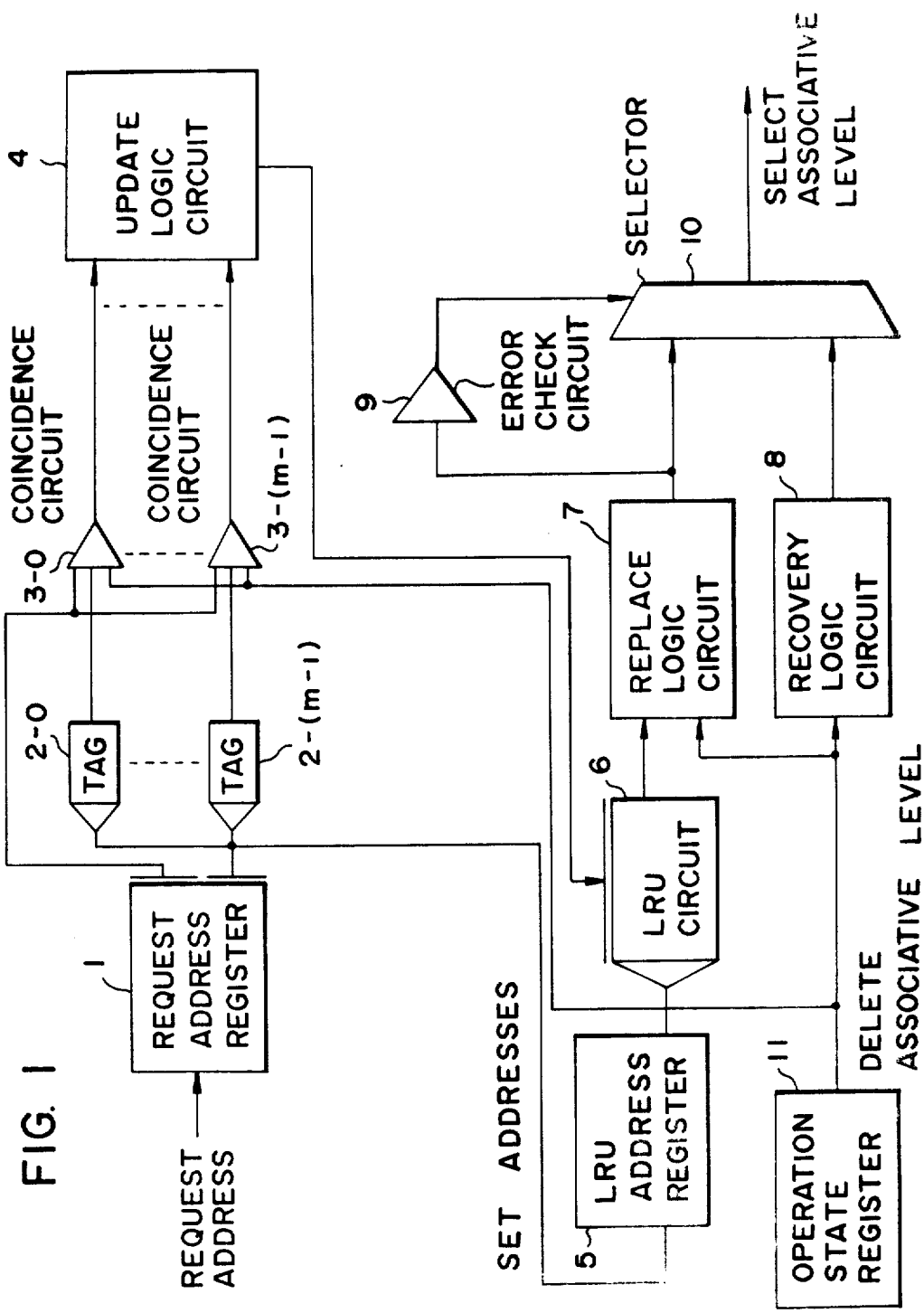
FIG. 1 is a block diagram of an embodiment of the error processing system for a buffer storage according to the present invention.

In FIG. 1, reference numeral 1 indicates a request address register; 2-0 to 2-(m-1) designate tag portions or circuits 3-0 to 3-(m-1) identify coincidence circuits; 4 denotes an update logic circuit; 5 represents an LRU address register; 6 shows an LRU circuit; 7 refers to a replace logic circuit; 8 signifies a recovery logic circuit; 9 indicates an error check circuit; 10 designates a selector; and 11 identifies an operation state register.

Figure 2:
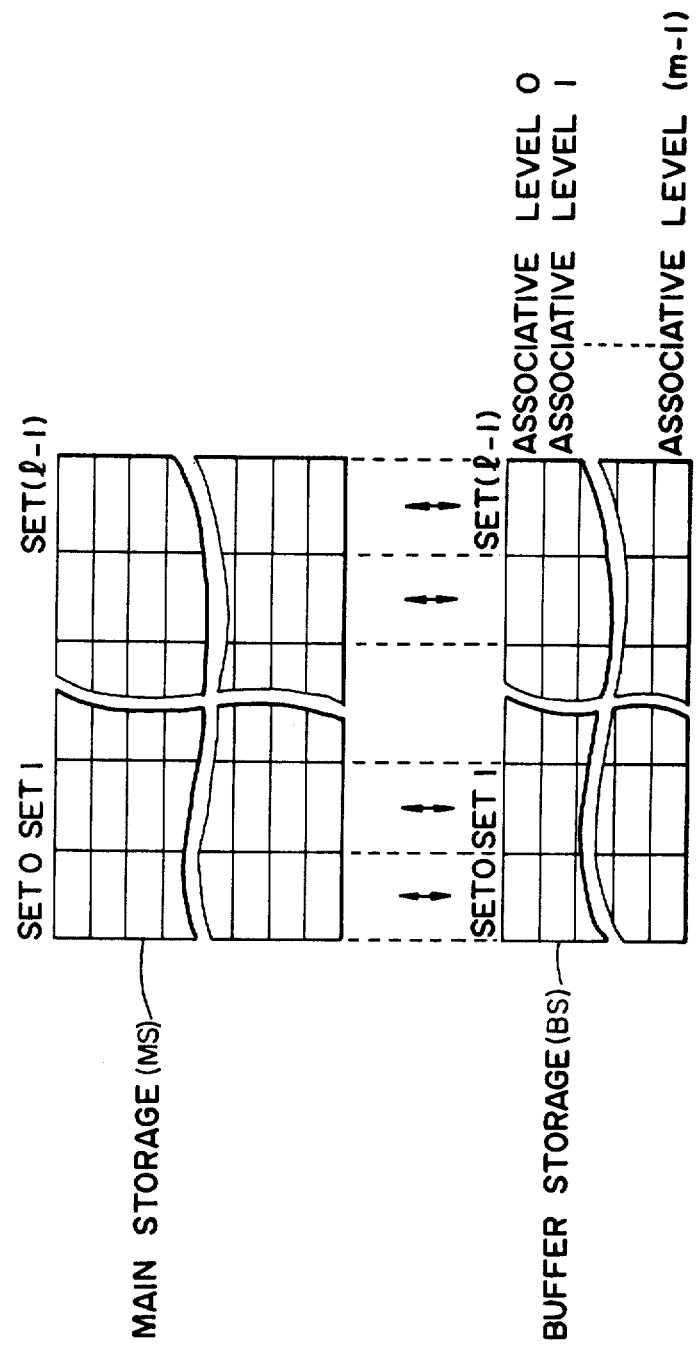
FIG. 2 is a diagram of a buffer storage of a set associative data storage system.

In FIG. 2, reference character MS indicates a main storage, and BS designates a buffer storage. The main storage MS and the buffer storage BS each comprises l segments in the column direction, and these segments will hereinafter be referred to as sets 0, 1, . . . , (l-1), respectively. In the row direction the main storage MS has many segments but the buffer storage usually has a small number of segments. In the following, m segments of the buffer storage BS will be referred to as associative levels 0, 1, . . . , (m-1), respectively. The individual segments thus defined in the main storage MS and the buffer storage BS will hereinafter be referred to as blocks. The set associative system performs storage and replacement of data between the blocks in the same set of the main storage MS and the buffer storage BS when executing a program.

When a request for access is applied from a processor or the like to the buffer storage BS, a request address corresponding to the data to be accessed is set in the request address register 1 of FIG. 1. The request address consists of a high-order address and a low-order address, the former corresponding to the segment number in the row direction in the main storage MS and the latter the number of the set. The high-order address in the register 1 is provided to the coincidence circuits 3-0 to 3-(m-1) and the low-order register is input to the tag portions 2-0 to 2-(m-1). The tag portions 2-0 to 2-(m-1) are provided corresponding to the associative levels 1 to (m-1) in the buffer storage BS, and they store the main storage addresses of all data (each given the same address as in the main storage MS) stored in the buffer storage BS at the levels corresponding to them and, when retrieved by a set address, outputs the high-order address of the block concerned. The coincidence circuits 3-0 to 3-(m-1) each generate a tag coincidence signal when the high-order address input thereto from the tag portion corresponding thereto and the high-order address from the request address register 1 coincide with each other and, based on the tag coincidence signal, the block concerned in the buffer storage is accessed.

When any one of the coincidence circuits 3-0 to 3-(m-1) outputs the tag coincidence signal, the update logic circuit 4 yields update information which indicates the order of storage of data stored in the set concerned in the buffer storage BS. The set associative system which performs such processing has already been set forth in U.S. Pat. No. 3,588,829, for instance. The update information generated by the update logic circuit 4 is provided to the LRU circuit 6. The LRU circuit 6 has stored therein LRU information indicating the order of storage of the data in each block belonging to the set, that is, an LRU pattern and, upon each application of the update information from the update logic circuit 4, the LRU pattern in the set concerned is rewritten.

When corresponding address exists in the tag portions 2-0 to 2-(m-1) and no tag coincidence signal is produced, the address in the request address register 1 is set in the LRU address register 5, from which it is provided to the LRU circuit 6, thereby reading out the LRU information of the set concerned. The LRU information thus read out is applied to the replace logic circuit 7, which in turn selects, based on the LRU information and delete associative level information from the operation state register 11, one of undeleted blocks to be replaced and outputs via the selector 10 the information as select associative level information, thus replacing data of the block concerned in the buffer storage BS. Delete associative level information is provided when the stored contents of the buffer storage of the tag portion has a fixed fault and the content of the block concerned is unusable, and the delete associative information is intended to delete the data of the block. This information is input from the operation state register 11. To each of the coincidence circuits 3-0 to 3-(m-1) is applied the delete associative level information for the level corresponding thereto and when the information is a 0, the generation of the tag coincidence signal is inhibited.

Replace logic in the replace logic circuit 7 in this case is determined in the manner described below. Now assuming that the temporal use relationship between associative levels i and j (where i>j) where each bit of the LRU pattern, represented by Lij=1 or Lij=0, indicates, depending on whether the level i is used earlier than the level j, the temporal relationship between the associative levels i and j of a bit Lij taking into account that the condition for deletion is determined by the following expression:

$$LDij = Lij \cdot \overline{DELETE\ j} + \overline{DELETE\ i} \qquad (1)$$

where DELETE i and DELETE j indicate whether the associative levels i and j are to be deleted and let it be assumed that they take a value "1" or "0" depending on whether the levels are to be deleted or not. Assuming that the number of associative levels m=4, that is, i, j=0 to 3, it is determined by the following expression whether to replace the associative levels 0 to 3:

$$REPLACE\ 0 = \overline{LD_{01} \cdot LD_{02} \cdot LD_{03}}$$

$$REPLACE\ 1 = LD_{01} \cdot \overline{LD_{12} \cdot LD_{13}}$$

$$REPLACE\ 2 = LD_{02} \cdot LD_{12} \cdot \overline{LD_{23}}$$

$$REPLACE\ 3 = LD_{03} \cdot LD_{13} \cdot LD_{23} \qquad (2)$$

In the above expression, when the value of the left side is 1, it indicates that the associative level is to be replaced, and when the value is 0 that, the associative level is to be not replaced.

In the case where the replace logic circuit 7 has a fault and does not generate the output indicating the level to be replaced, the error check circuit 9 detects this state and instructs the selector 10 to select the output from the recovery logic circuit 8. The recovery logic circuit 8 determines, based on the delete associative level information, one of the undeleted blocks to be replaced and outputs the information as the select associative level information via the selector 10. Thus, even if the replace logic circuit 7 has a fault, replacement can be effected in the buffer storage BS. The method of recovery and circuit implementing it are optional; for example, it is possible to employ logic selecting a level of the lowest number among the associative levels belonging to the same set except deleted levels.

Figure 3:
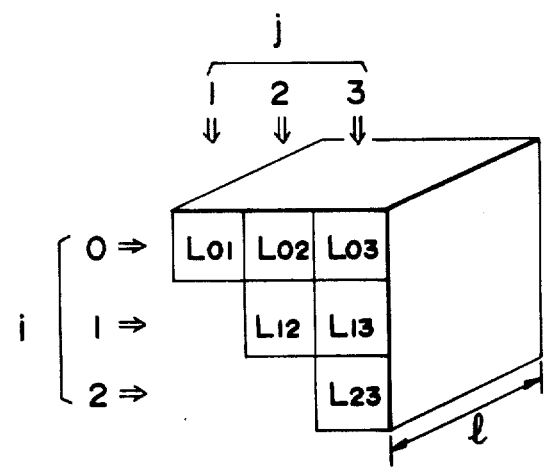
FIG. 3 is a diagram of an LRU pattern.

FIG. 3 shows, by way of example, the contents of the LRU pattern in the above-described embodiment with regard to the case where the number of associative levels m is four. In FIG. 3, reference characters $L_{01}$, $L_{02}$, $L_{03}$, $L_{12}$, $L_{13}$ and $L_{23}$ indicate six bits of information corresponding to each bit Lij (where i, j=0 to 3, i<j) of the LRU pattern. The LRU circuit 6 in FIG. 1 has stored therein LRU patterns l sets.

Figure 4A:
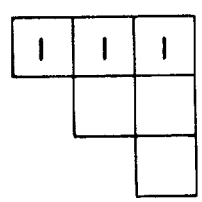
FIGS. 4A to 4D are diagrams of an updating method.
Figure 4C:
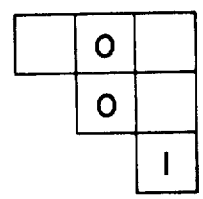
Figure 4B:
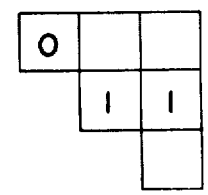
Figure 4D:
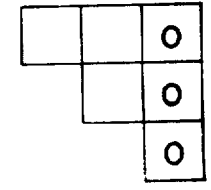

FIGS. 4A to 4D are explanatory of a method for updating the LRU pattern shown in FIG. 3, each section showing the same bits as in FIG. 3. FIG. 4A shows a method for updating the pattern so that the associative level 0 becomes the latest used regardless of the other levels in the case where the associative level 0 is the most recently referred to data. Similarly, FIGS. 4B to 4D illustrate respectively, levels 1, 2 and 3 becoming the latest used.

FIG. 5 shows an example of recovery logic, in which DELETE 0 to DELETE 3 respectively indicate whether the associative levels 0 to 3 are to be deleted, 0 indicating that the level is to be deleted, and 1 indicating that the level is not to be deleted. RECOVER ASS 0 to 3 show instructions for the levels to be replaced and a value 1 indicates that the level is to be replaced and a value 0 indicates that the level is not to be replaced.

FIGS. 6A to 6D illustrate replace logic circuits for executing the replace logic of Eqs. (1) and (2) and found in replace logic circuit 7 of FIG. 1. In FIG. 6A, reference characters $LRU_1$ to $LRU_6$ identify latch circuits which latch the bits $L_{01}$, $L_{02}$, $L_{03}$, $L_{12}$, $L_{13}$ and $L_{23}$ of the LRU pattern of six bits and yield latch outputs +L01, +L02, +L03, +L12, +L13 and +L23, respectively. In FIG. 6B, an operation state register 11 is the same as that used in FIG. 1 and, at the start of the system, it receives delete associative level inputs corresponding to the m associative levels and holds them and generates delete associative level information DELETE 0 to 3. The delete associative level information DELETE 0 to 3 are each provided as a signal having a sign + or − depending on whether the level concerned is to be deleted. In FIG. 6C are the circuits which execute the operation of Eq. (1) using the information of each bit of the LRU pattern and the delete associative level information and yield bits LD01, LD02, LD03, LD12, LD13 and LD23 taking into account the condition regarding deletion. Each of these bits takes the form of a signal having a sign + or − corresponding to its value 1 or 0. FIG. 6D illustrates circuits which execute the operation of Eq. (2) using each bit of the LRU pattern and generate outputs +REPLACE 0 to 3 which indicate that the respective levels are to be replaced.

Figure 7:
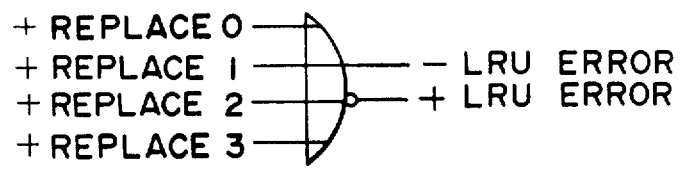
FIG. 7 is a diagram of the error check circuit 9 of FIG. 1.

FIG. 7 illustrates, by way of example, the arrangement of the error check circuit 9, which produces an output −LRU ERROR indicating the absence of an error when the replace logic circuit 7 yields any one of the outputs +REPLACE 0 to 3, and produces an output +LRU ERROR indicating the presence of an error when none of the outputs +REPLACE 0 to 3 are provided.

Figure 8:
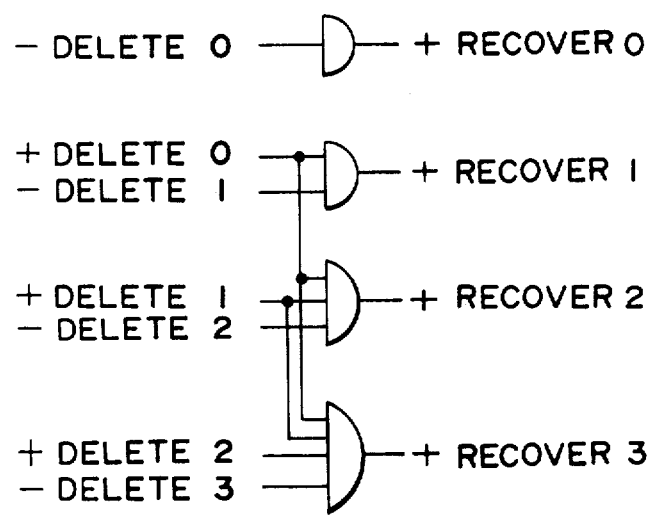
FIG. 8 is a diagram of the recovery logic circuit 8 of FIG. 1.

FIG. 8 illustrates an example of the arrangement of the recovery logic circuit 8 for executing the recovery logic shown in FIG. 5. The recovery logic circuit 8 generates, based on the delete associative level information from the operation state register shown in FIG. 6B, outputs +RECOVER 0 to 3 indicating the levels to be replaced.

Figure 9:
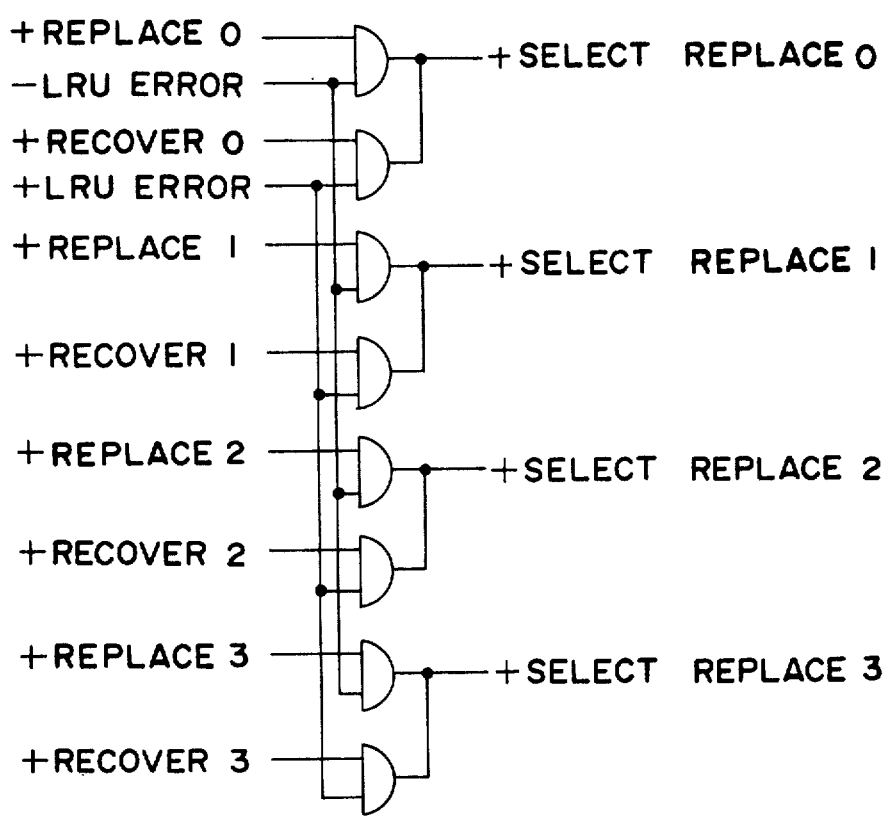
FIG. 9 is a diagram of the selector of FIG. 1.

FIG. 9 illustrates, by way of example, the arrangement of the selector 10, which receives the outputs +REPLACE 0 to 3 from the replace logic circuit 7, the outputs +RECOVER 0 to 3 from the recovery logic circuit 8 and the outputs +LRU ERROR and −LRU ERROR from the error check circuit 9. Depending on whether an error is present in the LRU circuit 6 or not, the selector 10 selects any one of the outputs +REPLACE 0 to 3 or +RECOVER 0 to 3 and provides a corresponding one of the outputs +SELECT REPLACE 0 to 3.

Figure 10:
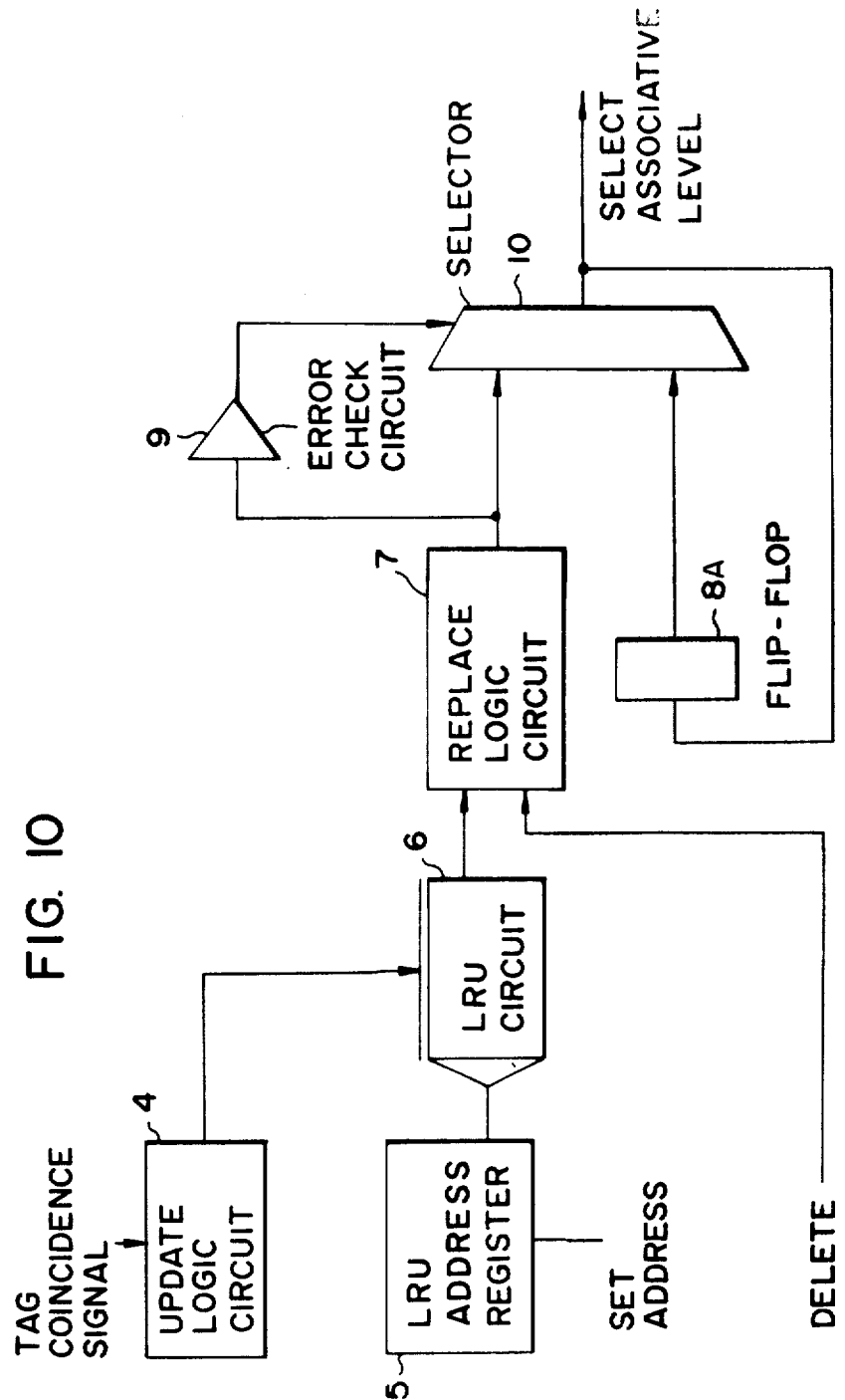
FIG. 10 is a block diagram of another embodiment of the error processing system for a buffer storage according to the present invention.

FIG. 10 illustrates only the principal part of another embodiment of the present invention, which employs recovery logic different from that used in the embodiment of FIG. 1. In FIG. 10 the parts corresponding to those in FIG. 1 are identified by the same reference numerals. Reference numeral 8A indicates a flip-flop. When no error occurs in the LRU circuit 6, the operation of the embodiment of FIG. 10 is the same as in the case of FIG. 1 and the selector 10 selects the output from the replace logic circuit 7 and outputs it as a select associative level. The flip-flop 8A is set by the output from the selector 10 and held in the set state. When the error check circuit 9 detects an error, the selector 10 is changed by the output from the error check circuit 9 to select the output from the flip-flop 8A instead of the output from the replace logic circuit 7. As a result, the select associative level immediately before the occurrence of the error, stored in the flip-flop 8A, is output without interruption.

The error processing system of the present invention is generally usable not only for a buffer storage of the swap system type copying a portion of information of a main storage for use in the buffer storage but also for a buffer storage of the store through system type.

It will be apparent that many modifications and variations may be effected without departing from the scope of the novel concepts of the present invention.

What is claimed is:

1. An error processing system for buffer storage which is provided with first replace block designating means for storing some of blocks into which a main storage is divided and, when a new block is to be stored, for designating a block to be replaced using least recently used logic for designating the least recently used block as the block to be replaced, the error processing system comprising:
    error detecting means, connected to the first replace block designating means, for detecting an error in the least recently used logic in which the first replace block designating means does not designate the block to be replaced; and
    second replace block designating means, connected to said error detecting means, for designating a block to be replaced using logic different from the least recently used logic of the first replace block designating means; and
    wherein the block designated by said second replace block designating means is designated as the block to be replaced in response to the detection of the error by said error detecting means.

2. An error processing system for a buffer storage which is provided with first replace blocks designating means for storing some of blocks into which a main storage is divided and, when a new block is to be stored, designatng a block to be replaced based on least recently used logic for designating the least recently used block as the block to be replaced, the error processing system comprising:
    error detecting means, connected to the first replace block designating means, for detecting an error on the basis of a state in which the replace block designating means does not designate the block to be replaced; and
    second replace block designating means, connected to said error detecting means, for designating a block to be replaced based on logic different from the least recently used logic; and
    wherein the block designated by said second replace block designating means is designated as the block to be replaced in response to the detection of the error by said error detecting means and the least recently used logic in the first replace block designating means is executed excepting a deleted block.

3. An error processing system for a buffer storage which is provided with first replace block designating means for storing some of blocks into which a main storage is divided and, when a new block is to be stored, designating a block to be replaced based on least recently used logic for designating the least recently used block as the block to be replaced, the error processing system comprising:
    error detecting means, connected to the first replace block designating means, for detecting an error on the basis of a state in which the replace block designating means does not designate the block to be replaced; and second replace block designating means, connected to said error detecting means, for designating a block to be replaced based on logic different from the least recently used logic; and wherein the block designated by said second replace block designating means is designated as the block to be replaced in response to the detection of the error by said error detecting means and the logic in said second replace block designating means, different from the least recently used logic, designates a block having the lowest number.

4. An error processing system for a buffer storage according to claim 3, wherein the logic in said second replace block designating means is executed excepting a deleted block.

5. An error processing system for a buffer storage which is provided with first replace block designating means for storing some of blocks into which a main storage is divided and, when a new block is to be stored, designating a block to be replaced based on least recently used logic for designating the least recently used block as the block to be replaced, the error processing system comprising:

error detecting means, connected to the first replace block designating means, for detecting an error on the basis of a state in which the replace block designating means does not designate the block to be replaced; and second replace block designating means, connected to said error detecting means, for designating a block to be replaced based on logic different from the least recently used logic; and wherein the block designated by said second replace block designating means is designated as the block to be replaced in response to the detection of the error by said error detecting means and the logic in said second replace block designating means, different from the least recently used logic, designates a block designated immediately before the error detection by said error detecting means.

6. An error processing system for buffer storage which is provided with first replace block designating means for storing some of blocks into which a main storage is divided and, when a new block is to be stored, designating a block to be replaced based on least recently used logic for designating the least recently used block as the block to be replaced, the error processing system comprising:

error detecting means, connected to the first replace block designating means, for detecting an error on the basis of a state in which the replace block designating means does not designate the block to be replaced; and second replace blocks designating means, connected to said error detecting means, for designating a block to be replaced based on logic different from the least recently used logic, where the block designated by said second replace block designating means is designated as the block to be replaced in response to the detection of the error by said error detecting means; and selection means, operatively connected to said first and second replace blocks designating means and said error detecting means, for selecting the designation by the second replace block designating means when an error is detected by said error detecting means and for selecting the designation by the first replace block designating means when no error is detected.

7. An error processing system according to claim 6, wherein said error detecting means comprises a first OR gate connected to said first replace block designating means and said selection means.

8. An error processing system according to claim 7, wherein said second replace block designating means comprises first AND gates connected to said first replace block designating means and said selection means.

9. An error processing system according to claim 8, wherein said selection means comprises second AND gates connected to said first AND gates, said first OR gate and said first replace block designating means.

10. An error processing system according to claim 9, wherein said first replace block designating means comprises:

a request address register;

an operation state register connected to said first AND gates;

a tag circuit connected to said request address register;

a coincidence circuit connected to said tag circuit and said operation state register;

an update logic circuit connected to said coincidence circuit;

a least recently used address register connected to said request address register;

a least recently used circuit connected to said least recently used address register and said update logic circuit; and a replace logic circuit connected to said operation state register, said least recently used circuit, said first OR gate and said second AND gates.

11. An error processing system according to claim 10, wherein said replace logic circuit comprises:

latches connected to said least recently used circuit;

third AND gates connected to said latches and said operation state register;

second OR gates connected to said third AND gates; and fourth AND gates connected to said second OR gates, said first OR gates and said second AND gates.

12. An error processing system according to claim 7, wherein said second replace block designating means comprises a flip-flop connected to said selection means.

13. An error processing system according to claim 12, wherein said selection means comprises second AND gates connected to said flip-flop, said first OR gate and said first replace block designating means.

14. An error processing system according to claim 13, wherein said first replace block designating means comprises:

a request address register;

an operation state register;

a tag circuit connected to said request address register;

a coincidence circuit connected to said tag circuit and said operation state register;

an update logic circuit connected to said coincidence circuit;

a least recently used address register connected to said request address register;

a least recently used circuit connected to said least recently used address register and said update logic circuit; and a replace logic circuit connected to said operation state register, said least recently used circuit, said first OR gate and said second AND gates.

15. An error processing system according to claim 14, wherein said replace logic circuit comprises:

latches connected to said least recently used circuit;

third AND gates connected to said latches and said operation state register;

second OR gates connected to said third AND gates; and fourth AND gates connected to said second OR gates, said first OR gates and said second AND gates.

* * * * *

UNITED STATES PATENT AND TRADEMARK OFFICE
CERTIFICATE OF CORRECTION

PATENT NO. : 4,507,729

DATED : March 26, 1985

INVENTOR(S) : MASANORI TAKAHASHI ET AL.

It is certified that error appears in the above-identified patent and that said Letters Patent is hereby corrected as shown below:

Col. 1, line 18, "with" should be --the--;

line 22, after "is" insert --,--.

Col. 2, line 2, "circit" should be --circuit--;

line 9, "the state" should be --it--.

Col. 3, line 7, "register" should be --address--;

line 37, after "when" insert --no--;

line 48, after "thus" insert --,--.

Col. 4, line 23, "0 that," should be "0, that--;

line 47, after "patterns" insert --for--;

"sets" should be --set--.

Col. 7, line 65, "blocks" should be --block--.

Signed and Sealed this

Seventeenth Day of September 1985

[SEAL]

Attest:

DONALD J. QUIGG

Attesting Officer

Commissioner of Patents and
Trademarks—Designate